June 21, 1949.  H. H. FELDSTEIN  2,473,641
EVAPORATOR

Filed March 26, 1945  4 Sheets-Sheet 1

INVENTOR.
Henry H. Feldstein
BY
Hull, West,
ATTORNEYS

June 21, 1949. H. H. FELDSTEIN 2,473,641
EVAPORATOR
Filed March 26, 1945 4 Sheets-Sheet 2
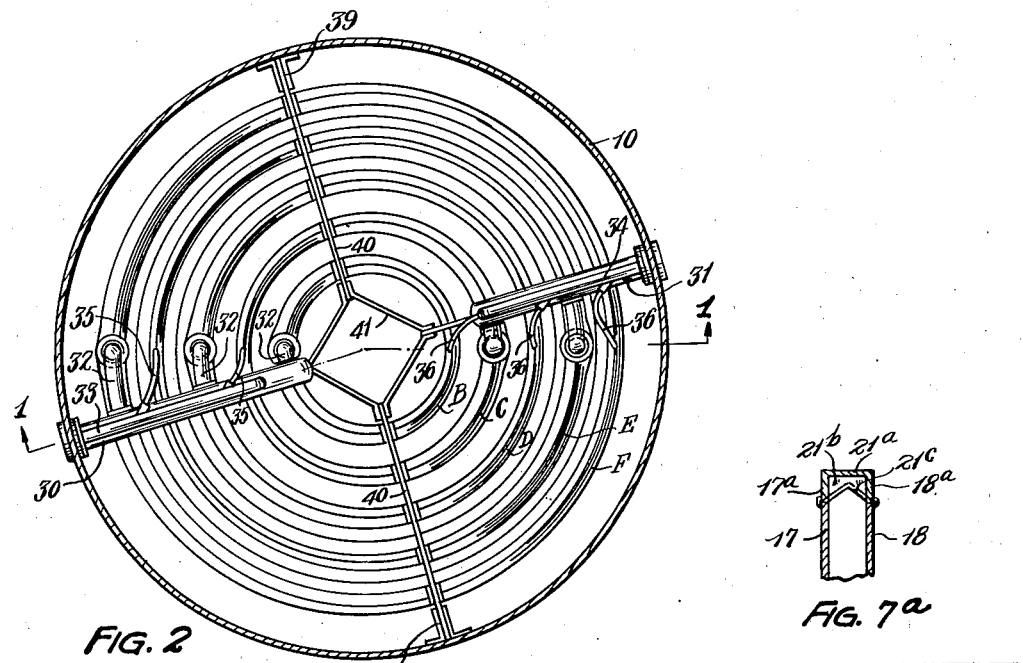
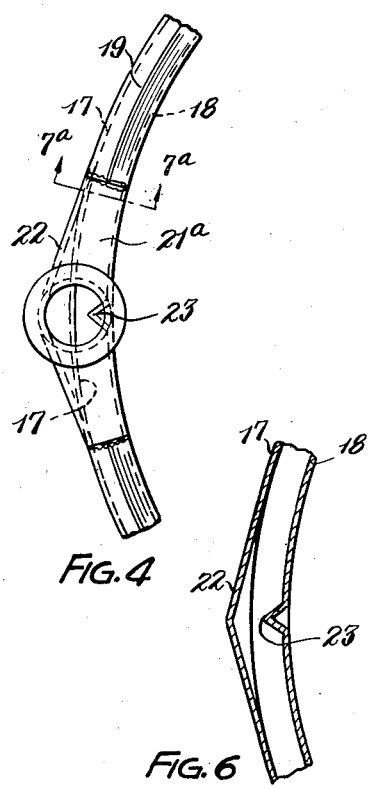
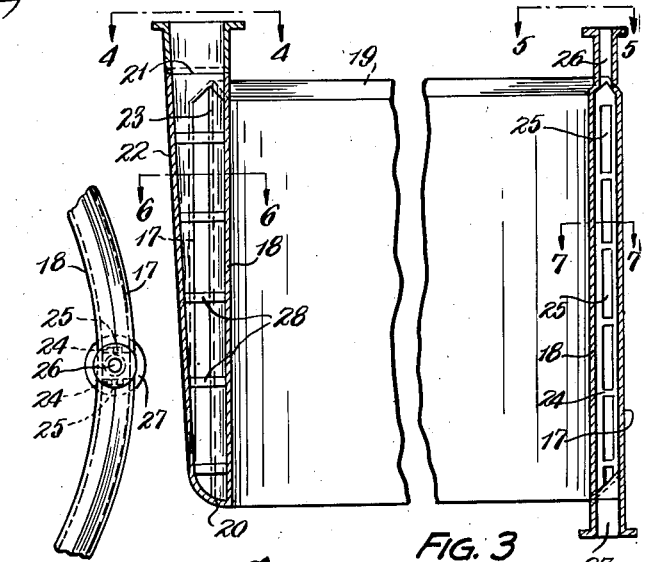
INVENTOR.
Henry H. Feldstein
BY
Hull West
ATTORNEYS June 21, 1949. H. H. FELDSTEIN 2,473,641
EVAPORATOR
Filed March 26, 1945 4 Sheets-Sheet 3

INVENTOR.
Henry H. Feldstein,
BY
Hull & West
ATTORNEYS

Patented June 21, 1949

2,473,641

UNITED STATES PATENT OFFICE 2,473,641

EVAPORATOR

Henry H. Feldstein, Cleveland, Ohio

Application March 26, 1945, Serial No. 584,941

16 Claims. (Cl. 257—197)

1

This invention relates to sugar machinery and more particularly to evaporators of the type known to the trade as vacuum pans, wherein the liquid to be treated is subjected to the action of a condensable heating fluid, such as steam, which is circulated through one or more heating or evaporating elements within, and having their respective exterior surfaces in contact with, the liquid. It has for its general object to increase the efficiency of such elements and consequently of evaporators having one or more of the said elements incorporated therewithin.

More particularly, my invention consists in making each of said elements in the form of a ring having an outer wall of substantially circular cross section and an inner wall forming an annular space with the outer wall and in constructing each of said elements in such manner that the space between the said walls will diminish in width from the inlet for the heating fluid toward the outlets for condensate and for incondensable gases.

A still further object of the invention is to provide, in evaporators of the vacuum pan type of large capacity, a novel assembly of a plurality of heating elements of the above described type whereby maximum evaporating efficiency may be obtained.

Figure 1:
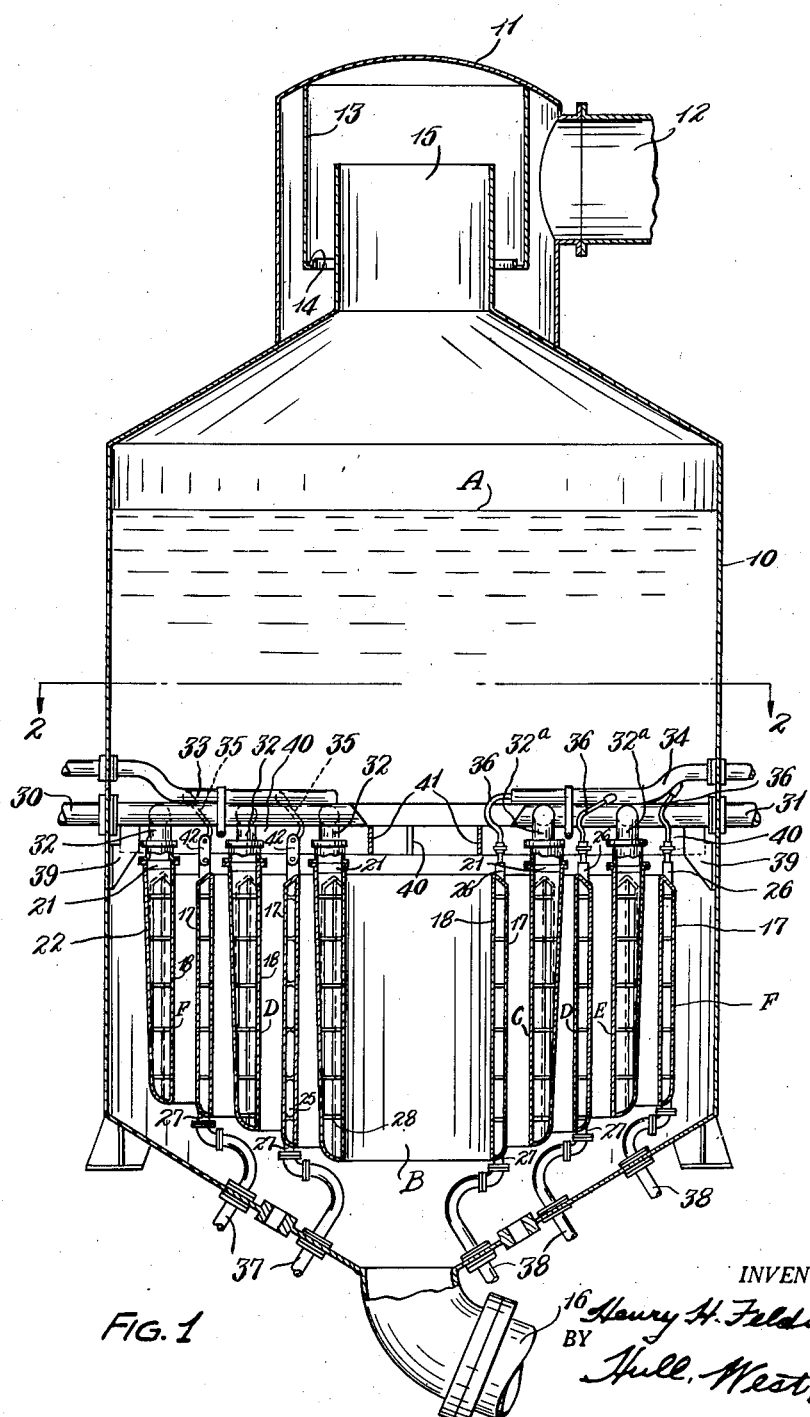
Figure 8:
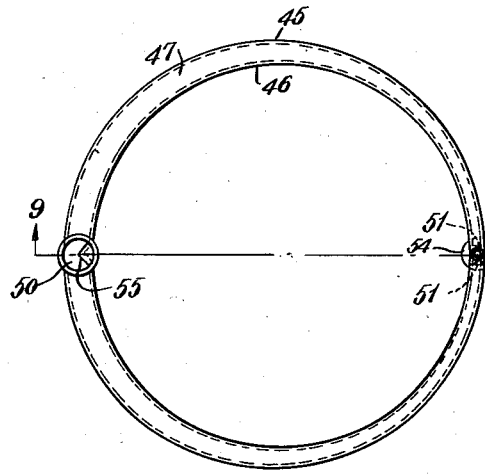
Figure 11:
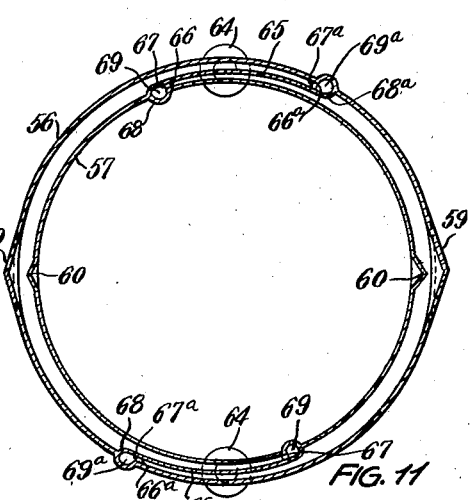
Figure 9:
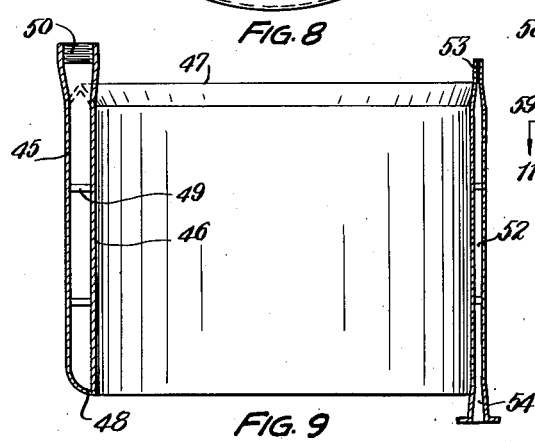
Figure 10:
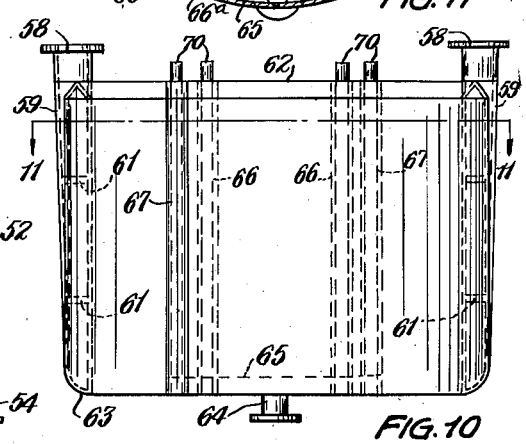

Further and more limited objects and advantages of my invention will be set forth in connection with the description of the drawings forming part hereof, wherein Fig. 1 represents a vertical sectional view, taken substantially on the line 1—1 of Fig. 2, through an evaporator of the vacuum pan type having therein a plurality of heating or evaporating elements built in accordance with my invention, only one of such elements, for convenience of illustration, being shown in said figure as provided at its outlet end with slotted partitions or baffles, the purposes and functions of which will be set forth hereinafter; Fig. 2 is a sectional view taken on the line 2—2 of Fig. 1; Fig. 3 is a vertical sectional view through one of the elements shown in Figs. 1 and 2; and Fig. 4 a detail in plan taken on the line 4—4 of Fig. 3; Figs. 5, 6 and 7 are details in section taken on the lines 5—5, 6—6 and 7—7 of Fig. 3, respectively, and Fig. 7ª a detail in section taken on the line 7ª—7ª of Fig. 4; Fig. 8 is a plan view of a modification of one of the heating or evaporating elements shown in the preceding views; and Fig. 9 is a sectional view corresponding to the line 9—9 of Fig. 8; Fig. 10 is a side elevational view of another form of heating or evaporating element; Fig. 11 is a

Figure 13:
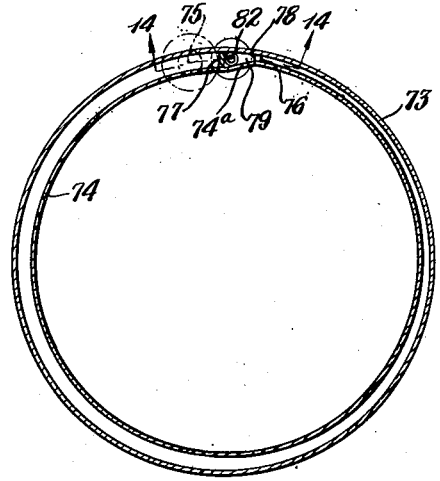
Figures 14, 15:
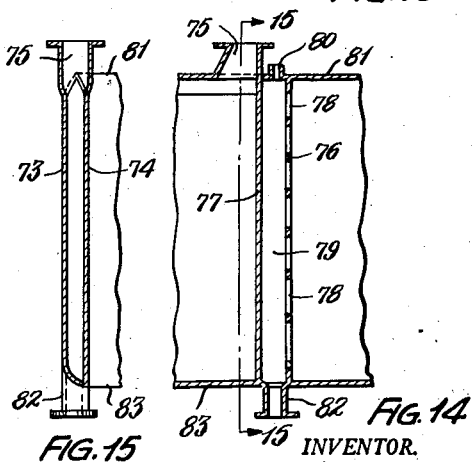
Figure 12:
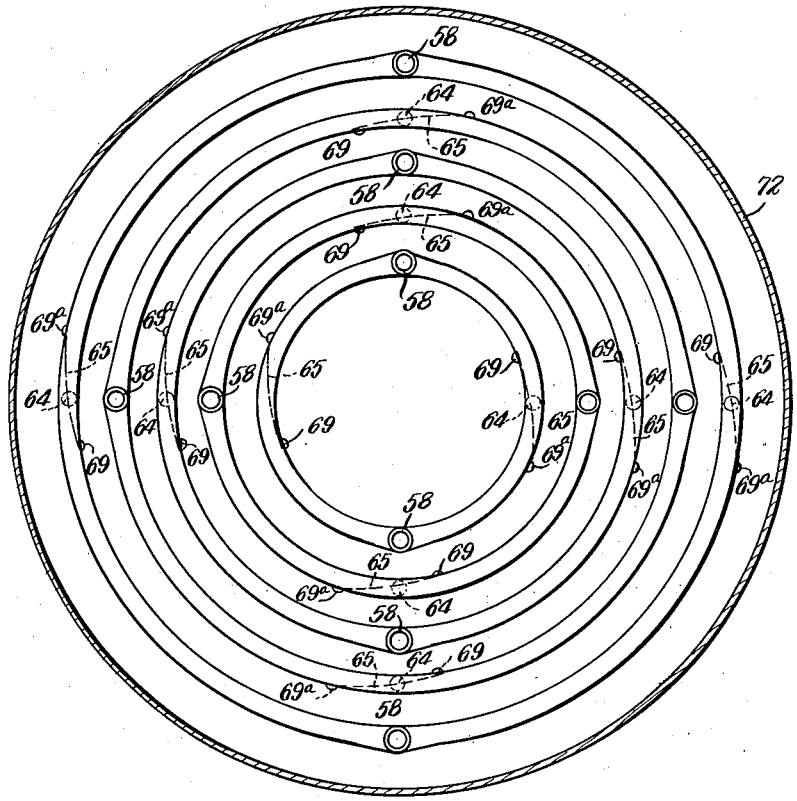

2 sectional view taken on the line 11—11 of Fig. 10, and Fig. 12 is a diagrammatic sectional plan view showing the manner in which a plurality of the heating or evaporating elements shown in Figs. 10 and 11 are preferably assembled within a vacuum pan; Fig. 13 is a view, similar to Fig. 11, of another construction of heating or evaporating element constructed in accordance with my invention; Fig. 14 is a sectional view taken approximately on the line 14—14 of Fig. 13; and Fig. 15 is a sectional view taken on the line 15—15 of Fig. 14.

Describing by reference characters the various figures of the drawings, and first in connection with Figs. 1 to 7ª, inclusive, 10 denotes the cylindrical casing wall of a vacuum pan, the same being provided with a dome 11 at the top having an outlet connection 12 leading to a condenser and provided therewithin with a cylindrical wall 13 having a trough 14 at its bottom and constituting what is known as a "catch-all" surrounding the steam outlet 15 from the vacuum pan, the level of the liquid to be evaporated (massecuite) being indicated at A. The bottom of the vacuum pan is of inverted frusto-conical shape and is provided with an outlet 16 through which the residue resulting from the treatment of the massecuite in the vacuum pan is discharged for further treatment.

Submerged within the massecuite within the vacuum pan is a nest of heating or evaporating elements constructed in accordance with my invention, the particular construction of one of which elements is shown more particularly in Figs. 1–7ª, inclusive. Each of these heating or evaporating elements, which are shown as differing only in respect to their diameters and lengths, is of ring form and consists of an outer cylindrical wall 17 and an inner wall 18 arranged eccentrically within the outer wall whereby the space between the said walls diminishes from the inlet to the diametrically opposite outlet. These walls are united at their tops and bottoms by walls 19 and 20, respectively.

21 denotes the upper portion of a connection for supplying steam to the space between the inner and outer walls of one of the aforesaid elements, the bottom of the connection registering and communicating with an opening provided in the top 21ª of a channeled connector member having depending outer and inner walls 17ª and 18ª the bottoms of which are adapted to engage the tops of the walls 17 and 18, respectively, and be secured thereto, as by welding. The wall 19 is cut away in order to permit the channeled member to be properly positioned with respect to the walls 17 and 18, and the ends of this channeled member are provided with webs 21ᵇ each having an inverted V-shaped notch 21ᶜ extending upwardly from the bottom thereof, the said webs being preferably welded to and serving to seal the opposed ends of the wall 19 while the notches permit the steam to be delivered beneath the said wall. The wall 17ᵃ projects outwardly in a flattened V-shape to conform to the shape of the top of the portion 22 of the wall 17 which it engages. This portion 22 of the wall 17 converges from the top to the bottom thereof where it merges with and forms a symmetrical part of the lower portion of the outer wall 17. The inner wall is provided with a vertical V-shaped rib 23, the apex of which is in substantially the same radial plane which intersects the apex of the inlet wall 22 and the center of the inlet connection, whereby steam admitted through the inlet 21 is distributed uniformly in opposite directions into the space provided between the walls 17, 18, 19 and 20. 24 denotes vertical opposed baffle walls providing therebetween a vertical passage 24ᵃ located diametrically opposite the apex of the rib 23 and being located at the narrowest portion of the space formed between the walls 17 and 18. These baffle walls are provided with slots 25, and the top of the passage 24ᵃ formed between the said baffle walls communicates with an outlet 26 for incondensable gases, while the bottom of the said passage 24ᵃ communicates in turn with an outlet 27 for condensed gases. The inner and outer walls 17 and 18 are connected by stay bolts 28.

The particular shape of the inlet portion 22 of the wall 17 tends to equalize the distribution of the steam between the top and bottom of the annular space formed between the walls 17 and 18, and the gradual diminution in width of the said space from the inlet to the outlet enables the steam to travel throughout said space at substantially uniform velocity notwithstanding its volume is being continually diminished, due to condensation. It also enables the steam to contact both walls of the ring, notwithstanding such diminution in its volume by condensation, and thereby to heat these walls substantially uniformly throughout their respective extents. This enables both walls of the heating element or ring to function most efficiently in effecting heat interchange between the said ring or element and the massecuite. Still further, due to the maintenance of the initial velocity with which the steam enters each ring or element, the air and any other non-condensable gas which may be present in the steam will be efficiently forced out by the steam, thereby increasing the capacity or heating efficiency of each element.

As stated hereinbefore, an evaporator or vacuum pan of small capacity may be heated by only a single ring or heating element of the type shown and described. However, in an apparatus of large capacity, I employ a plurality of the aforesaid elements, nested within and spaced from one another and submerged within the massecuite. In Figs. 1 and 2, I have shown the preferred manner in which I employ a plurality of the said elements.

For convenience of description, the elements are identified by the letters B, C, D, E and F from the innermost element to the outermost element, it being noted that, due to the inverted conical shape of the bottom of the evaporator, the elements increase in length from the outermost to the innermost thereof. It will be noted further that the elements are arranged in two series, one series including the elements B, D and F and the other series including elements C and E which alternate with the elements of the first series. It will be noted further that the inlet connections 21 of each series are arranged in substantially the same radial plane with the centers of the said elements and that the outlet connections for the elements of one series are located adjacent to the inlet connections for the elements of the other series and that these outlet connections are in substantially the same radial plane as the inlet connections.

30 and 31 denote inlet headers for steam extending from opposite sides of the receptacle 10 toward, but terminating short of, the center. The header 30 is connected by ducts 32 with the inlets 21 of the elements B, D and F, while the header 31 is connected by ducts 32ᵃ with the inlets of the elements C and E, it being noted that the element C is nested between and spaced from the elements B and D and that the element E is nested between and spaced from the elements D and F and that the inlets and outlets for one set of elements are substantially diametrically spaced from the inlets and outlets for the other set.

33 and 34 denote small headers, shown as arranged above the headers 30 and 31, respectively, and each is connected by a pipe 35, 36, respectively, with an outlet 26, whereby any uncondensed gases contained in the steam and which pass through the slots in the baffles 24 may be conducted to their respective headers. In like manner, any condensate which may result from the circulation of steam through the elements is discharged from the spaces between the baffles and the bottoms of the elements by pipes 37 and 38.

The assembly of heating elements may be supported within the vacuum pan in any desired manner. As shown herein, 39 denotes supporting brackets secured to and within the wall of the vacuum pan and from which bars 40 extend inwardly above and beyond the top of the innermost element B, where they are connected by means of a central frame 41. The bars 40 serve to support the outlet ends of the elements by means of hangers 42.

In Figs. 8 and 9 there is shown a modification of the heating or evaporating rings or elements shown in the preceding views. In these views 45 denotes the outer wall, 46 the inner wall, 47 the top wall and 48 the bottom wall of a ring-like element, the said walls being united by stay bolts 49. It will be noted that both walls are cylindrical but that the inner wall is arranged eccentrically with respect to the outer wall whereby the space between the said walls diminishes substantially uniformly from opposite sides of the inlet 50 to the space formed between the baffle walls 51, which space is located diametrically opposite the inlet. The baffle walls are provided with slots 52 and the space between the baffle walls communicates at its top with an outlet 53 for incondensable gases and at its bottom with an outlet 54 for condensate. The inner wall is preferably provided with a V-shaped rib 55 similar to the rib 23 in the preceding form of my invention.

It is believed that the operation of the heating or evaporating ring or element shown in Figs. 8 and 9 will be readily understood and that such a ring or element functions in substantially the same manner as is the case with the elements shown and described hereinbefore, in respect to the heating of the massecuite and the removal of incondensable gases and condensate.

In Figs. 10 and 11 there is shown a further modification of a heating or evaporating element or ring wherein the outer wall 56 and the inner wall 57 are substantially concentric, but wherein means are incorporated in said element or ring for maintaining substantially uniform the velocity of the steam passing between and contacting the said walls. As will appear by reference to Figs. 10 and 11, each ring or element is provided with diametrically opposed inlets 58, these inlets being substantially identical with the inlets shown and described in connection with Figs. 1–7a, inclusive, each inlet having a V-shaped outer wall 59 forming part of the cylindrical outer wall 56 and which converges from the top to the bottom thereof, where it merges with the outer wall 56. The inner wall is provided with diametrically opposed V-shaped ribs 60, similar to the rib 23 in the embodiment of my invention shown in Figs. 1–7a and similarly arranged with respect to the V-shaped outer walls of the inlets. Stay bolts 61 are provided for uniting the inner and outer walls. The tops of the inner and outer walls are united by a top all 62 and the bottoms by a bottom wall 63.

The bottom wall is provided with diametrically opposed outlets 64 for condensate, the said outlets being shown as spaced 90° from the inlet connections 58. 65 denotes a pair of partitions, each forming with the outer wall 56 and with the inner wall 57 extended spaces for the passage of steam supplied to the ring or element through an inlet connection 58 and which spaces diminish progressively in width toward their respective outlets. These outlets are formed by baffle walls 66, 66a having slots 67, 67a therein, the baffle walls opposed to the walls 66 being curved walls 68, each of which is formed jointly by an end of a partition 65 and an inward extension of the inner wall 57 and the curved baffle walls 68a opposed to the walls 66a each being formed jointly by the opposite end of a partition and an outward extension of the outer wall 56, the baffle walls providing therebetween vertical passages 69, 69a, the top of each of which passages is provided with an outlet connection 70 for the escape of incondensable gases. The partitions extend from the top of each of the heating elements or rings to a point adjacent to but spaced from the bottom, while the passages 69, 69a extend below the bottoms of the said partitions, thereby providing spaces above the bottom wall 63 for the delivery of condensate from the passages 69 to the outlets 64. It will be noted that the passages 69, 69a of each pair of passages are located on opposite sides of and are approximately equidistantly spaced from their respective condensate outlets 64.

In Fig. 12 there is shown a schematic cross sectional view through a vacuum tank, indicated at 72, wherein a plurality of the rings or elements shown in Figs. 10 and 11 are nested in the same manner as are the rings or elements in Figs. 1 and 2. It will be understood that, instead of using two headers for supplying steam to the rings or elements shown in Fig. 12, four such headers will be required and also that eight headers for the incondensable gases will be required instead of the two headers shown in Figs. 1 and 2; also that a condensate delivery pipe will be connected to each of the opposed outlets of each ring or element.

In Figs. 13, 14 and 15, I have shown a still further modification of the manner of constructing heating rings or elements wherein the outer wall 73 of each element is cylindrical while the inner wall consists of a major section 74, of spiral form, whereby the width of the space between the outer wall and the wall section 74 diminishes from the inlet 75 to the vertical passageway for condensate and incondensable gases provided between the baffle walls 76 and 77, the former baffle wall being provided with slots 78 and being located at the narrowest width of the space between the inner and outer walls, from which point the minor inner wall section diverges from the outer wall, as shown at 74a, where it is united with the portion of the major section of the inner wall adjacent to the inlet end, which portion is spaced a maximum distance from the outer wall. The baffle wall 77 is imperforate, and the space between the baffle walls 76 and 77 and the portions of the inner and outer walls between which these baffle walls extend provides a vertical passage 79 the upper end of which communicates with a nipple or similar connection 80 extending through the top wall 81 of the ring or element while the bottom end of said passage communicates with an outlet 82 secured to the bottom wall 83.

The embodiments of my heating or evaporating rings or elements shown in Figs. 8 and 9 and 13 to 15 are adapted for efficient operation in connection with vacuum pans of small capacity, while the forms shown in the other views are efficient for use in vacuum pans of large capacity.

Each of the heating or evaporator rings or elements shown herein is constructed in such manner that the width of the space between the inner and outer walls thereof diminishes progressively from the inlet to the outlet thereof, whereby particularly efficient heating of the massecuite is obtained. Furthermore, each of the heating or evaporator rings or elements shown and described herein is provided at the outlet end with means for effectively separating incondensable gases from the condensate and for removing the said gases and condensate. Still further, the manner of assembling the heating or evaporator rings or elements in apparatus of large capacity results in extremely efficient operation of such apparatus in respect to the evaporation of the massecuite.

Having thus described my invention, what I claim is:

1. A heating or evaporator element for the purpose specified comprising an annular outer wall and an annular wall within and spaced from the outer wall, the tops and bottoms of the said walls being united, the said element being provided with an inlet connection for supplying a condensable heating fluid to the space between the said walls, the said element being provided with an outlet at the top for incondensable gases and an outlet at the bottom for condensate, the said outlets being angularly spaced from the inlet and the distance between the inner and outer walls diminishing substantially progressively from the inlet toward the outlets.

2. A ring-like heating or evaporator element for the purpose specified comprising an outer wall and a wall within and spaced from the outer wall, the tops and bottoms of the said walls being united, the said element being provided with an inlet connection for supplying a condensable heating fluid to the space between the said walls, the said element being provided with an outlet at the top for incondensable gases and an outlet at the bottom for condensate, the said outlets being vertically aligned and angularly spaced from the inlet and the distance between the inner and outer walls diminishing substantially progressively and uniformly along the entire distance from the inlet to the outlets.

3. A heating or evaporator element for the purpose specified comprising an annular outer wall and an annular wall within and spaced from the outer wall, the tops and bottoms of the said walls being united, thereby providing a space between said walls for a condensable heating fluid, the said element being provided with an inlet connection for supplying a condensable heating fluid to the said space, vertically extending opposed baffle walls extending between the said inner and outer walls and constituting the delivery end of said space and providing therebetween a vertical passageway having an outlet at the top for incondensable gases and an outlet at the bottom for condensate, one of the said opposed baffle walls being provided with openings for the reception of incondensable gases and condensate, the said opposed baffle walls being spaced angularly from the inlet and the distance between the inner and outer annular walls diminishing substantially progressively from the inlet connection therewith toward the perforated baffle wall.

4. A heating or evaporator element for the purpose specified of ring-form comprising inner and outer walls, the tops and bottoms of which are united, the said element being provided with an inlet connection for supplying a condensable heating fluid into the top of the space between the said walls and thence to the bottom of the said space, the said element being provided at a point substantially diametrically opposite the said inlet with vertically extending opposed baffle walls providing a passageway therebetween having an outlet at the top for incondensable gases and an outlet at the bottom for condensate, the said baffle walls being provided with openings for the reception of incondensable gases and condensate and the distance between the inner and outer walls of the said element diminishing substantially progressively in opposite directions from the inlet toward the said opposed baffle walls, and means associated with said inner wall and extending toward said outer wall adjacent said inlet to aid in dividing the inlet fluid into two streams for flow through the heating or evaporator element.

5. In the heating or evaporator element set forth in claim 4, the inner wall being provided with a vertically extending V-shaped rib projected toward but spaced from the outer wall and said means, the apex of the V-shaped wall being substantially coincidental with a vertical plane intersecting the center of the element and the center of the inlet connection.

6. A heating or evaporator element for the purpose specified of ring-form comprising inner and outer walls, the tops and bottoms of which are united, the said element being provided with an inlet connection for supplying a condensable heating fluid into the top of the space between the said walls and thence to the bottom of the said space, the said outer wall having a receiving section constituting a vertical continuation of said connection and projecting at its top beyond the adjacent portions of said outer wall and converging from the top to the bottom of the said element and merging with and forming a symmetrical part of the lower portion of the said outer wall, the said element being provided at a point substantially diametrically opposite the said inlet with vertically extending opposed baffle walls providing a passageway therebetween having an outlet at the top for condensate, the said baffle walls being provided with openings for the reception of incondensable gases and condensate and the distance between the inner and outer walls of the said element diminishing substantially progressively in opposite directions from the inlet toward the said baffle walls.

7. In the heating or evaporator element recited in claim 6, the inner wall of the said element being provided with a vertical V-shaped rib extending therefrom toward and spaced from the outermost projecting portion of the receiving section of the outer wall and extending substantially the full length of the said inner wall.

8. A heating or evaporator element of ring-form for the purpose specified, said element comprising inner and outer concentric walls, the tops and bottoms of said walls being united, diametrically opposed inlet conections for supplying condensate fluid between the inner and outer walls thereof, diametrically opposed outlets for condensate communicating with the bottom of the space between the said walls and located substantially 90° from the said inlet connections, partitions in diametrically opposed portions of the said space and extending on opposite sides of the respective outlets, each partition being connected at one end with an imperforate baffle wall formed with the inner wall of the element and at its opposite end with an imperforate baffle wall formed with the outer wall of the said element, there being a perforated baffle wall opposed to each of the imperforate walls and bridging the spaces between the partition and the inner wall and the partition and the outer wall, respectively, the said baffle walls forming vertical passages provided at their tops with outlets for incondensable gases and communicating at their bottoms with the respective outlets for the discharge of condensate.

9. In the heating or evaporator element set forth in claim 8, the inner wall of said element being provided with vertically extending V-shaped ribs located beneath their respective inlet connections and projecting toward but spaced from the outer wall of said element.

10. A heating or evaporator element comprising an outer cylindrical wall and an inner wall comprising a spiral wall section, having one end relatively widely spaced from the outer wall and its opposite end in close proximity to the outer wall at a point adjacent to its own opposite end and an inner wall section connecting the ends of the spiral wall section, an inlet connection for a condensable fluid communicating with the top of the space between the outer wall and the spiral section of the inner wall at a point adjacent to the greatest distance therebetween, a perforated vertical baffle wall extending across the narrowest space between the outer wall and the end of the spiral wall section which is remote from said inlet connection, an imperforate baffle wall opposed to the first mentioned baffle wall and extending across the space between the outer wall and the second inner wall section and forming with the first mentioned baffle wall and the corresponding portions of the inner and outer walls a vertical passage having an outlet for incondensable gases extending through the top of the element and having an outlet for condensate extending through the bottom of said element.

11. An evaporating apparatus of the character set forth comprising a series of heating elements of ring-like form and each comprising vertically extending inner and outer walls having their tops and bottoms united, the said elements varying in diameters and being arranged concentrically with respect to and spaced from one another with each element except the outermost element arranged within the adjacent outer element, each of the said elements having an inlet conection at the top thereof for supplying condensable fluid downwardly into the space between the inner and outer walls thereof and each element having a vertical passage for incondensable gases and condensate angularly spaced from the inlet connection and communicating with the space between the inner and outer walls of said element and provided with an outlet at the top and an outlet at the bottom thereof, a header located within the said receptacle and extending above the tops of the said elements and communicating with the inlet connections thereof for supplying a condensable heating fluid therethrough, means communicating with the outlet at the top of each passage for removing incondensable gases therefrom and means connected with the outlets at the bottoms of said passages for the evacuation of the condensate the distance between the inner and outer walls diminishing substantially progressively and uniformly along the entire distance from the inlet to the outlet.

12. An evaporating apparatus of the character set forth comprising heating elements of ring-like form and each comprising vertically extending inner and outer walls having their tops and bottoms united, the said elements varying in diameters and being arranged concentrically with respect to and spaced from one another with each element except the outermost element arranged within the adjacent outer element, each of the said elements having an inlet connection at the top thereof for supplying condensable fluid downwardly into the space between the inner and outer walls thereof and each element having a vertical passage for incondensable gases and condensate angularly spaced from the inlet connection and communicating with the space between the inner and outer walls of said element and provided each with an outlet at the top and an outlet at the bottom, the said elements being arranged in two series, each series including alternating elements, with the inlet connections of each series in substantially the same radial plane which includes the centers of the said elements and with the outlet conections of each series in substantially the same radial plane which includes the inlet connections and the centers of the said elements, the inlet connections for the elements of one series being located adjacent to the vertical passages for incondensable gases and condensate of the elements of the other series, a header for condensable heating fluid extending into said receptacle above the inlet connections of the elements of each series and means connecting the said headers to the said inlet connections, a header for incondensable gases extending into the said receptacle and connected to the outlets for incondensable gases from the elements of said series, and means connected with the bottoms of the aforesaid passages for the evacuation of condensate therefrom.

13. In the heating or evaporator element set forth in claim 2, a pair of perforate baffles; interposed between and separating the inlet portion of the element from the outlet portion thereof, said baffles being substantially normal to both of said walls and being vertically directed adjacent said outlet to form an outlet column between said walls.

14. A heating or evaporator element of ring-form for the purpose specified, said element comprising inner and outer concentric walls, the tops and bottoms of said walls being united, diametrically opposed inlet connections for supplying condensable fluid between the inner and outer walls thereof, diametrically opposed outlets for condensate communicating with the bottom of the space between the said walls and located substantially 90° from the said inlet connections, partitions in diametrically opposed portions of the said space and extending on opposite sides of the respective outlets, each partition being connected at opposite ends with vertical passages for the discharge of incondensable gases through outlets provided in the top of the element and for the discharge of condensate through outlets provided in the bottom of said element.

15. A heating or evaporating apparatus comprising an inner wall and an outer wall which are of substantially concentric shape and arrangement; a pair of arcuate baffle walls each associated with substantially diametrically opposed sections of the evaporator intermediate said inner and outer walls, said baffle walls having vertically extending small substantially semi-cylindrical portions formed on the ends thereof, said inner and outer walls having vertically extending small substantially semi-cylindrical sections formed thereon adapted to mate with said semi-cylindrical portions of said baffle walls to form vertically extending conduits therewith, said baffle walls being perforated in the semi-cylindrical portions thereof.

16. An evaporator apparatus as in claim 2 wherein said inner and outer walls are formed from substantially annular members which are positioned in eccentric relationship so as to form progressively smaller spaces intermediate said walls from the inlet connection thereof to the outlet connection therefor.

HENRY H. FELDSTEIN.

REFERENCES CITED

The following references are of record in the file of this patent:

UNITED STATES PATENTS

| Number | Name | Date |
|---|---|---|
| 3,366 | Stephens | Dec. 4, 1843 |
| 248,796 | Roos | Oct. 25, 1881 |
| 953,607 | Grantzdorffer | Mar. 29, 1910 |
| 1,198,536 | Groen | Sept. 19, 1916 |
| 1,246,939 | Sadtler | Nov. 20, 1917 |
| 1,586,814 | Leonard | June 1, 1926 |
| 1,650,122 | Grantzdorffer | Nov. 22, 1927 |
| 2,065,147 | Munson et al. | Dec. 22, 1936 |

FOREIGN PATENTS

| Number | Country | Date |
|---|---|---|
| 53,519 | Sweden | May 18, 1920 |